United States Patent [19]

Shannon

[11] 4,252,570
[45] Feb. 24, 1981

[54] BISMUTH OXYHALIDE SOLID SOLUTION

[75] Inventor: Robert D. Shannon, Chadds Fords, Pa.

[73] Assignee: E. I. Du Pont de Nemours and Company, Wilmington, Del.

[21] Appl. No.: 103,959

[22] Filed: Dec. 14, 1979

[51] Int. Cl.³ .............................................. C01G 29/00
[52] U.S. Cl. ................. 106/288 B; 106/291; 423/466
[58] Field of Search .......................... 106/288 B, 291; 423/466, 472

[56] References Cited

U.S. PATENT DOCUMENTS

| | | | |
|---|---|---|---|
| 2,974,053 | 3/1961 | Suchow | 106/291 |
| 3,788,871 | 1/1974 | Mullio | 106/291 |
| 3,917,671 | 11/1975 | Piper | 423/472 |

FOREIGN PATENT DOCUMENTS 794235  2/1936  France .
2187714 2/1974  France .

OTHER PUBLICATIONS

Bannister, F., "The Crystal-Structure of the Bismuth Oxyhalides", *The Mineralogical Magazine*, vol. XXIV, No. 149, (Jun. 1935), pp. 49–57.
Baumer, W. "Bismuth Salts as Nacreous Pigments ", *Bull. Bismuth Institute*, (Brussels), pp. 1–4, Series 15, (1977).
Brauer, G. *Handbook of Preparative Inorganic Chemistry*, 2nd Ed., Academic Press, N.Y., (1963), vol. 1, pp.621–626.
Gmelin's Handbuch *Anorganische Chem.*, 8th Ed., 19, (1927), Verlag Chemie, Berlin, pp. 147–160.

*Primary Examiner*—Brian E. Hearn

[57] ABSTRACT

Bismuth oxyhalide solid solution having the PbFCl structure and of the formula $BiOI_{1-x-y}Br_xCl_y$ wherein x is 0 to about 0.8, y is 0 to about 0.3 and $x+y$ is about 0.1 to about 0.8.

9 Claims, 1 Drawing Figure

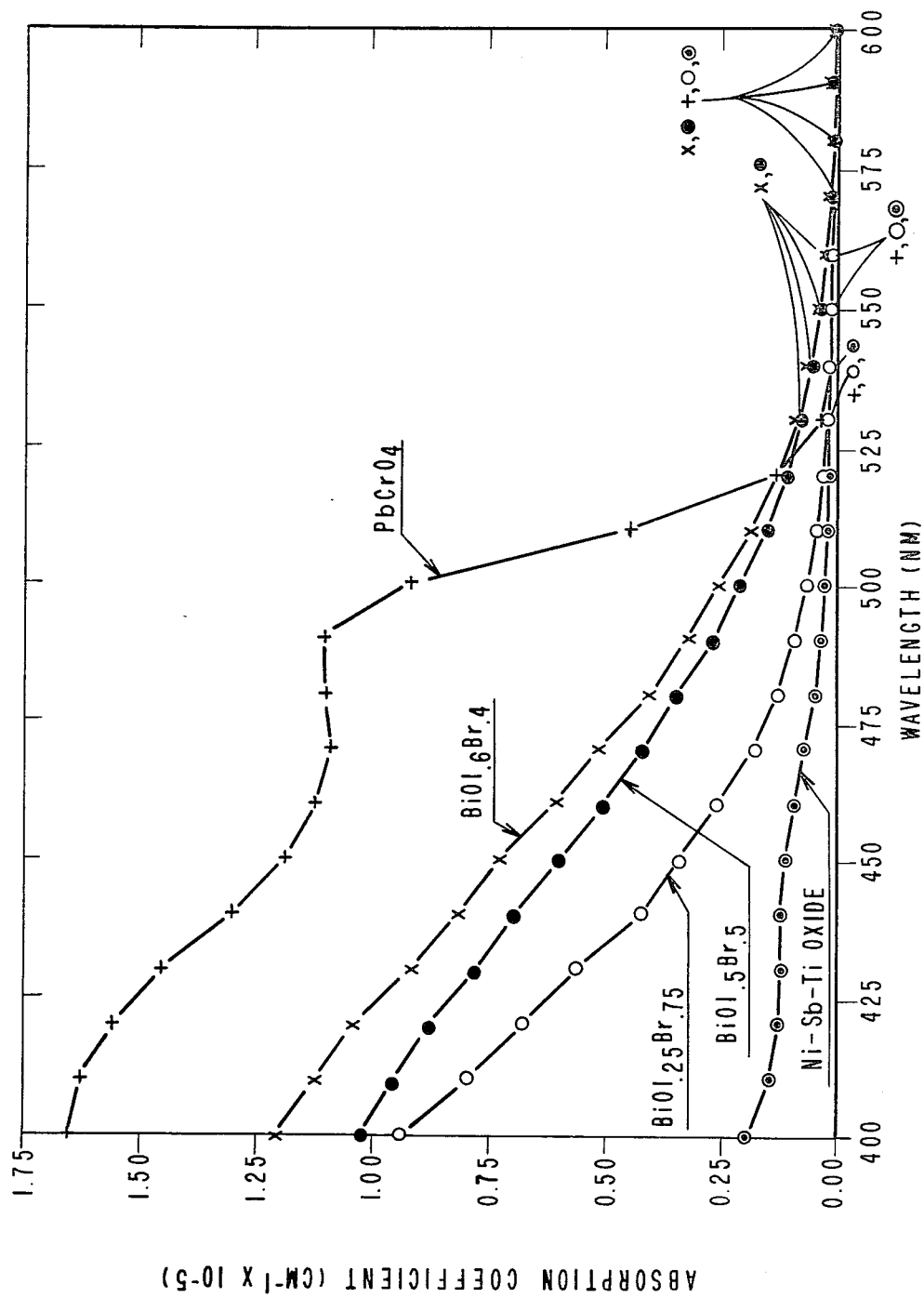

BISMUTH OXYHALIDE SOLID SOLUTION

DESCRIPTION

Technical Field

This invention relates to bismuth oxyhalide solid solutions and to the use of such solid solutions as pigments.

BACKGROUND

Pigments are used to impart color and opacity to products such as paints, plastics, inks, glazes, and paper. Ideally, a pigment should have: strength, that is, only small amounts should be required to tint a white pigment; intensity, that is, purity of shade or absence of dullness or greyness; light-fastness, that is, resistance to color change when exposed to sunlight; resistance to bleed, that is, low migration of color in the pigmented article; and thermal stability. In addition, for many applications, it is desirable that a pigment have good hiding power, that is, ability to efficiently opacify the pigmented article.

Both inorganic and organic pigments are in common use. Inorganic pigments generally have the advantage of high opacity, high thermal stability, an ability to form bright, deep shade colors, and excellent bleed resistance. Typical inorganic pigments having yellow, orange, or red colors are lead chromate ($PbCrO_4$), nickel titanate ($NiTiO_3$), cadmium sulfide (CdS), and iron oxides (FeOOH and $Fe_2O_3$).

Concerns presently are being manifested in the art and in the trade regarding the toxicity and, particularly, the carcinogenicity of commonly used pigments and heavy metals. The need exists, therefore, for nontoxic pigments with high hiding power and intensity and good strength, lightfastness, bleed resistance, and thermal stability.

The compounds BiOCl, BiOBr, and BiOI are known in the literature. They crystallize in the tetragonal PbFCl structure with space group $P4_n/mm$ (Bannister, Min. Mag. 24, 49 (1935)). BiOCl and BiOBr are colorless. BiOCl has long been used as a nacreous pigment in cosmetics. The nacreous or pearlescent effect is intensified by precipitating the BiOCl on mica or clays (U.S. Pat. Nos. 2,974,053, 3,788,871 and 3,917,671). The nontoxic qualities of BiOCl are attested to by its use in the coloring of externally-applied drugs and in cosmetics (Federal Register 42, #190, 52394, 1977; CA87:1893354). BiOI has been disclosed as a coral red nacreous pigment (M. Hunsdiecker, Fr. Patent 794,235).

BRIEF DESCRIPTION OF DRAWING

The FIGURE shows optical absorption curves for bismuth oxyhalide solid solutions of the invention, namely, $BiOI_{0.25}BR_{0.75}$, $BiOI_{0.5}Br_{0.5}$ and $BiOI_{0.6}Br_{0.4}$, and for some commercially available yellow pigments, namely, $PbCRO_4$ and Ni-Sb-Ti oxide (Harshaw Sun Yellow).

DISCLOSURE OF INVENTION

For further comprehension of the invention, and of the objects and advantages thereof, reference may be made to the following description and accompanying drawing, and to the appended claims in which the various novel features of the invention are more particularly set forth.

This invention relates to bismuth oxyhalide solid solutions of the PbFCl-related structure type and which are of the general formula $$BiOI_{1-x-y}Br_xCl_y$$

wherein x is 0 to about 0.8, y is 0 to about 0.3 and $x+y$ is about 0.1 to about 0.8. They exhibit colors varying continuously from yellow to orange to red-orange and they are useful as pigments for coloring paints, plastics, inks, glazes, and paper. The colors have good intensity, excellent strength and good fade resistance. Preferred are the solid solutions for which x is 0 to about 0.3, y is 0 to about 0.3 and $x+y$ is about 0.1 to about 0.3 and for which x is about 0.25 to about 0.8, y is 0 to about 0.05 and $x+y$ is about 0.3 to about 0.8; these solid solutions have the best fade resistance. Especially preferred are the solid solutions for which x is about 0.1 to about 0.8 and y is 0.

The term "solid solution" which has been used to characterize the pigments of this invention is a well recognized term in the study of properties of solids. It is defined in Webster's Third New International Dictionary as "a homogeneous solid phase capable of existing throughout a range of chemical compositions". The Condensed Chemical Dictionary, Fifth Edition, Reinhold Publishing Company, New York, 1956 defines a solid solution as a homogeneous crystalline material containing two or more substances in variable proportions.

The physical mixture of the colorless BiOCl and/or BiOBr with the brick red BiOI results in colored powders with strength inversely proportional to the quantities of BiOCl and BiOBr, although the hue remains substantially unchanged. The bismuth oxyhalide solid solutions of this invention are crystalline solids which surprisingly have strong colors, ranging continuously from yellow to orange to red-orange, generally, as the iodine content is increased. The compositions have good intensity and good fade resistance and are quite different from both physical mixtures of BiOI, BiOBr, and BiOCl and from the compounds themselves. The solid solution compositions of this invention have a tetragonal PbFCl-type structure. The tetragonal crystal structure can be verified by the characteristic X-ray diffraction pattern that is readily obtained by methods described in standard references such as B. D. Cullity, Elements of X-Ray Diffraction-Addison-Wesley, Reading, Mass. (1956). The Hägg-Guinier powder diffraction patterns of all the compositions of this invention are similar.

Compositions with lower Cl content have better fade resistance in the as-prepared state and this is an important consideration in choosing the preferred compositions.

The lightfastness and/or chemical resistance of the bismuth oxyhalide pigments can be improved by encapsulation in a dense amorphous coating of silica or a treatment with aluminum pyrophosphate. Coatings with silica can be applied in accordance with known processes, such as those disclosed in U.S. Pat. No. Re. 27,818 (reissue of U.S. Pat. No. 3,437,502); U.S. Pat. No. 3,639,133; U.S. Pat. No. 3,370,971; and U.S. Pat. No. 3,885,366. Such processes were used in coating $BiVO_4$ in U.S. Pat. No. 4,115,141 and U.S. Pat. No. 4,063,956.

The solid solutions of this invention can be prepared by precipitation by combining an aqueous solution of bismuth nitrate and acetic acid with an aqueous solution of a potassium or sodium halide and sodium acetate. It is strongly preferred to use a slight deficiency of bismuth nitrate so that the ratio $[I+Br+Cl]/NO_3^-$ is about 1.001 to about 1.1.

The reactants can be reagent or commercial grade bismuth nitrate, bismuth oxides, sodium acetate, and the alkali halides NaCl, NaBr, NaI, KCl, KBr, and KI. Precipitation is accomplished by combining the solution of bismuth nitrate and acetic acid with the solution of potassium or sodium halides and sodium acetate. The combined solution and resulting precipitate are stirred until the reaction is substantially complete. Stirring may be continued for periods of up to 24 hours or more. After the precipitate is allowed to settle, it can be washed until free of impurities, for example, by decantation 4 or 5 times with distilled water. The precipitation can be carried out at 10°–100° C., with larger crystallites resulting when the higher temperatures are used. The precipitate can be filtered off, washed, and dried in a vacuum oven at 120° C.

As already indicated, it is strongly preferred to use a slight deficiency of bismuth nitrate so that the ratio of halide to nitrate ions, that is, $[(1-x-y)I^- + xBr^- + yCl^-]/NO_3^-$ is about 1.001 to about 1.1. This is done in order to avoid oxidation of the iodide and to avoid synthesis of undesirable phases not having the PbFCl structure. Some solid solutions of this invention, in general, those with lower iodine contents, can be made by using the reactants in stoichiometric amounts, within normal experimental measurement error. For other compositions, particularly those with higher iodine contents, there must be a deficiency of nitrate in order to form the solid solution with the PbFCl structure. In summary, it is preferred to use a nitrate deficient combination of reactants, and when $x+y$ is less than about 0.5, it is necessary. Samples produced in a nitrate deficient process have greater fade resistance, that is, a greater resistance to ultraviolet degradation.

Rapid precipitation is useful to increase the apparent intensity of the color of the bismuth oxyhalide pigments of this invention. For this reason, it is preferred to bring about contact between the two solutions, that is, that containing the bismuth nitrate and that containing the halides, in as short a time as possible, for example, by allowing the one solution to flow into the other as a continuous stream in a period of seconds or minutes rather than to slowly drop the one solution into the other over a period of hours.

Bismuth oxyhalides can also be produced by techniques analogous to those described by Brauer for the preparation of BiOI (G. Brauer, Handbook of Preparative Inorganic Chemistry, Academic Press, 1963, 2nd Edition, p. 625), for example, (1) by heating a solution of $Bi_2O_3$ in hydriodic acid or (2) by precipitation upon combining a solution of $BiONO_3$, $HNO_3$, glycerol, and NaOH with a solution of potassium halides and acetic acid.

The intensity and lightfastness of the bismuth oxyhalide pigment in a paint can be measured from paint drawdowns. The paint is made by dispersing the pigment into a binder, in a 2:1 ratio, by weight, of pigment to binder, using a Hoover muller. The binder is composed of 98.9 parts, by weight, of #2 transparent varnish, for example, as made by Superor Varnish and Drier Company, Merchantsville, NJ, 1 part, by weight, as lead, of lead Nuodex ® drier (contains 24% lead), and 0.1 part, by weight, as manganese, of manganese Nuodex ® drier (contains 6% manganese). The paint is spread onto Crane 100% rag paper. The drawdowns are dried for about 72–120 hours in a well-ventilated room at 25° C. and less than about 50% relative humidity. The intensity is visually estimated and compared with commercial $PbCrO_4$ pigment drawdowns. This drawdown is commonly referred to as "the masstone."

The pigment can be diluted with the white pigment ZnO to form tints which are useful for a qualitative evaluation of strength and intensity. A ratio of ZnO to bismuth oxyhalide pigment of 50:1, by weight, has been used in the examples.

Lightfastness is determined after the dried paint drawdowns from above have been continuously exposed for 200 hours in an Atlas Color Fade-Ometer ® Type FDA-P. The darkening is visually estimated after exposure.

The spectrum of intrinsic-absorption coefficients is determined by application of the Kubelka-Munk theory to the diffuse reflectance spectrum of dilute (approximately 1%) mixtures of bismuth oxyhalide pigment in colorless $BaSO_4$ pigment. This dilution method and the Kubelka-Munk theory are discussed by G. Kortum, "Reflectance Spectroscopy", Springer-Verlag New York, Inc., New York, New York, 1969, pp. 109 ff, p. 175 ff, p. 214 ff.

For accurate measurements, the individual colored pigments particles must not be large compared with the optical absorption depth of light in the solid. For a strong pigment, the optical absorption depth in the visible part of the spectrum is $10^{-5}$ cm (0.1 $\mu$m) or less. Furthermore, the particles must not be agglomerated into lumps larger than the absorption depth. In general, for the measurements described herein, particle size is reduced by grinding. The ground pigment is suspended in water and centrifuged to remove large particles and agglomerates; in some instances, the grinding or the classifying step may be unnecessary. Then, the fines are heteroagglomerated onto the $BaSO_4$ diluent particles under conditions that discourage self-agglomeration of colored pigment particles with each other. The dried mixture is pressed into flat disc pellets.

The diffuse reflectance of the pellets is measured relative to that of pure $BaSO_4$ on a Cary 14 double beam spectrophotometer fitted with an integrating sphere. The procedure is standard and is discussed by Kortum, loc. cit., p. 226 ff. To obtain absolute reflectance, the observed relative reflectance is divided by the absolute reflectance of pure $BaSO_4$ as published by F. Grum and T. E. Wightman, Appl. Optics 16, 2775 (1977).

The intrinsic absorption coefficient, a, is derived from the Kubelka-Munk Function:

$$a \cong \frac{S}{2v_p} F(R_\infty) \text{ (cm}^{-1})$$

where S (cm$^{-1}$) is the scattering power of the diluent obtained from E. M. Patterson, et al., Appl. Optics 16, 729 (1977) (in this publication, the values given are s=S/2), $v_p$ is the volume fraction of the colored pigment in the mixture of powders, and $R_\infty$ is the absolute diffuse reflectance of a sample sufficiently thick so that further increase in thickness does not increase reflectance (typically about 3 mm). The volume fraction $v_p$ is calculated from the expression $$v_p = cP\frac{\bar{\rho}}{\rho_s}$$

where c is the mass concentration of colored pigment in the mixture, P is the packing fraction of the powdered mixture, $\rho_s$ (g/cm$^3$) is the intrinsic density of the colored pigment, $\bar{\rho}$ (g/cm$^3$) is the average intrinsic density (excluding empty space) of the mixture ($\bar{\rho}$ is approximately $\rho_d$ for a dilute system, where $\rho_d$ is the intrinsic density of the diluent, about 4.5 g/cm$^3$ for BaSO$_4$).

Optical absorption curves of the product BiOI$_{0.6}$Br$_{0.4}$ from Example 2, the product BiOI$_{0.5}$Br$_{0.5}$ from Example 4, and the product BiOI$_{0.25}$Br$_{0.75}$ from Example 6 are shown in the FIGURE, which is a part of this specification, along with those of the commercially available yellow pigments PbCrO$_4$ and Ni-Sb-Ti oxide (Harshaw Sun Yellow), for comparison. The oxyiodobromide samples have strong absorption in the ultraviolet ($\sim 1.3 \times 10^{-5}$ cm$^{-1}$) and are thus superior to NiTiO$_3$ and similar to PbCrO$_4$. The gradual change in color with increasing x of the BiOI$_{1-x}$Br$_x$ solid solutions of this invention from red orange to orange to yellow can be seen to result from the gradual shift of the absorption edge toward the blue region as Br replaces I. The slightly lower intensity of these pigments compared to PbCrO$_4$ can also be seen to result from the less steep edge of the BiOI$_{1-x}$Br$_x$ curves compared to that of PbCrO$_4$.

EXAMPLE 1

A solution containing 20 g of Bi(NO$_3$)$_3$.5H$_2$O in 30 cc of glacial acetic acid was prepared. A second solution containing 4.875 g of KI, 1.625 g of KBr, and 10 g of sodium acetate in 400 cc of H$_2$O was prepared. The combination of the two solutions corresponds to a [0.681$^-$+0.32Br$^-$]/NO$_3^-$ ratio of 1.04 and the composition BiOI$_{0.68}$Br$_{0.32}$. When the second solution was added to the first at room temperature ($\sim 20°$ C.), an unexpectedly bright orange precipitate formed immediately. The mixture was stirred at room temperature for 16 h, after which the precipitate was washed by decantation with H$_2$O, then filtered on a Millipore filter and dried at 120° C. This preparation yielded 13.2 g of a salmon colored powder which gave a single phase X-ray diffraction pattern (see Table I) characteristic of the tetragonal structure of PbFCl. Tetragonal cell dimensions obtained from an analysis of these data are a=3.966 A (396.6 pm), c=9.07 A (907 pm) and unit cell volume v=142.7 A$^3$ (1.427×10$^8$ pm$^3$), corresponding to the approximate composition BiOI$_{0.7}$Br$_{0.3}$.

The drawdown prepared with the powder indicated the masstone color to be reddish-orange and showed the pigment to have good strength. Exposure to UV light in the fadeometer indicated excellent resistance to degradation with only a slight color change after 200 h.

TABLE I

| X-Ray Diffraction Pattern of BiOI$_7$Br$_3$ | | | |
|---|---|---|---|
| hkl | d$_{obs}$ | d$_{calc}$ | I$_{obs}$ |
| 001 | 9.170 | 9.070 | 35 |
| 101 | 3.632 | 3.634 | 10 |
| 102 | 2.978 | 2.985 | 100 |
| 110 | 2.804 | 2.804 | 85 |
| 111 | 2.682 | 2.679 | 5 |
| 112 | 2.385 | 2.384 | 10 |
| 103 | | 2.404 | |
| 200 | 1.983 | 1.983 | 70 |
| 104 | | 1.968 | |
| 201 | 1.937 | 1.937 | 10 |
| 211 | 1.741 | 1.740 | 10 |
| 105 | | 1.649 | |
| 212 | 1.650 | 1.652 | 70 |
| 203 | | 1.658 | |
| 220 | 1.402 | 1.402 | 30 |
| 214 | | 1.397 | |
| 221 | 1.387 | 1.385 | 5 |
| 215 | | 1.268 | |
| 302 | 1.268 | 1.269 | 15 |
| 223 | | 1.272 | |
| 310 | 1.254 | 1.254 | 30 |

EXAMPLE 2

A solution containing 20 g of Bi(NO$_3$)$_3$.5H$_2$O in 30 cc of glacial acetic acid was added, at room temperature, to 400 cc of an aqueous solution containing 3.72 g of KI, 2.48 g of KBr and 10 g of sodium acetate. The combined solutions correspond to a [0.521$^-$+0.48Br$^-$]/NO$_3^-$ ratio of 1.05 and the composition BiOI$_{0.52}$Br$_{0.48}$. The resultant precipitate was treated as in Example 1. The product consisted of 12.8 g of a bright red-orange powder whose X-ray diffraction pattern was characteristic of the PbFCl structure. The crystallites, as evaluated by scanning and transmission electron microscopy, were disk shaped platelets with a diameter of $\sim 0.1$–$0.6$ $\mu$m and a thickness of $\sim 0.01$–$0.03$ $\mu$m.

Drawdowns prepared with the powder had good intensity and strength. After 200 h of exposure to ultraviolet light in the fadeometer, there was only a very slight change in color of the masstone and tint.

EXAMPLE 3

A solution containing 20 g of Bi(NO$_3$)$_3$.5H$_2$O in 30 cc of glacial acetic acid was added to 500 cc of an aqueous solution containing 2.766 g of KI, 2.974 g of KBr and 6.833 g of sodium acetate. The combined solutions correspond to a [0.41$^-$+0.6Br$^-$]/NO$_3^-$ ratio of 1.01 and the composition BiOI$_{0.4}$Br$_{0.6}$. The mixture, with the resultant yellow precipitate, was stirred for 24 h, then washed by decantation with H$_2$O 4–5 times. The product, which was filtered off and dried at 120° C., was an unexpected bright yellow powder whose X-ray diffraction pattern (shown in Table II) is characteristic of the tetragonal PbFCl structure. Cell dimensions of this yellow BiOI$_{0.4}$Br$_{0.6}$ are a=3.946 A (394.6 pm) and c=8.730 A (873.0 pm). Scanning electron micrographs showed that the crystallites were rounded platelets with a diameter of $\sim 0.2$–$0.5$ $\mu$m and a thickness of $\sim 0.05$–$0.1$ $\mu$m.

TABLE II

| X-Ray diffraction Pattern of BiOI$_4$Br$_6$ | | | |
|---|---|---|---|
| hkl | d$_{obs}$ | d$_{calc}$ | I$_{obs}$ |
| 001 | 8.755 | 8.743 | 50 |
| 002 | 4.376 | 4.371 | 2 |
| 101 | 3.594 | 3.596 | 40 |
| 102 | 2.924 | 2.929 | 100 |
| 003 | | 2.914 | |
| 110 | 2.792 | 2.790 | 65 |
| 111 | 2.657 | 2.658 | 10 |

TABLE II-continued

X-Ray diffraction Pattern of BiOI$_4$Br$_6$

| hkl | $d_{obs}$ | $d_{calc}$ | $I_{obs}$ |
|---|---|---|---|
| 112 | 2.350 | 2.352 | 25 |
| 103 | | 2.344 | |
| 200 | 1.973 | 1.973 | 60 |
| 201 | 1.924 | 1.924 | 15 |
| 202 | 1.797 | 1.798 | 5 |
| 211 | 1.728 | 1.729 | 25 |
| 212 | 1.635 | 1.636 | 70 |
| 203 | | 1.633 | |
| 213 | 1.513 | 1.509 | 5 |
| 204 | 1.465 | 1.464 | 2 |
| 220 | 1.395 | 1.395 | 40 |
| 221 | 1.376 | 1.377 | 10 |
| 214 | | 1.373 | |
| 301 | 1.300 | 1.300 | 5 |
| 302 | 1.259 | 1.259 | 25 |
| 223 | | 1.258 | |
| 310 | 1.248 | 1.247 | 40 |
| 007 | | 1.249 | |

EXAMPLE 4

This Example shows the necessity for using an excess of halide over nitrate in solution to avoid oxidation of I$^-$ when the halide is composed of 50% I. Two experiments were carried out, one having a stoichiometric amount of halide, the other having an excess of halide, in the solution used to prepare the precipitate.

In the stoichiometric reaction wherein the [0.5 I$^-$+0.5 Br$^-$]/NO$_3^-$ ratio is one, a solution of 122.53 g of Bi(NO$_3$)$_3$.5H$_2$O dissolved in 180 cc of glacial acetic acid was added rapidly to a solution of 20.97 g of KI, 15.03 g of KBr and 41.45 g of sodium acetate in 2200 cc of H$_2$O at 65° C. After the yellow-orange precipitate formed, the mixture was stirred vigorously for 24 h, then washed by decantation with H$_2$O 4-5 times. The product powder was filtered off and dried at 120° C. X-ray diffraction analysis indicated the structure of this yellow-orange powder was not the PbFCl type. The drawdown made from the powder and exposed for 200 h in the fadeometer showed significant darkening.

In the non-stoichiometric reaction wherein the [0.5 I$^-$+0.5 Br$^-$]/NO$_3^-$ ratio is 1.01, a solution of 60 g of Bi(NO$_3$)3.5H$_2$O dissolved in 90 cc of glacial acetic acid was added rapidly to a solution of 10.371 g of KI, 7.345 g of KBr and 20.5 g of sodium acetate in 1500 cc of H$_2$O at 65° C. After the yellow-orange precipitate formed, the mixture was stirred for 24 h, then washed by decantation 4-5 times. The product powder was filtered off and dried at 120° C. X-ray diffraction analysis of powder showed the PbFCl structure with the tetragonal cell dimensions a=3.954 A (395.4 pm) and c=8.817 A (881.7 pm). The drawdown prepared from this BiOI$_{0.5}$Br$_{0.5}$ powder showed a bright orange color. The intensity was somewhat dull and the strength as estimated from the tint preparation was medium. Fadeometer tests run on these drawdowns showed excellent resistance to ultraviolet light with no change in color after 200 h of exposure.

EXAMPLE 5

Rapid precipitation is useful in increasing the apparent intensity of the color of the bismuth oxyhalide pigments of this invention, as illustrated in this example for the composition BiOI$_{0.5}$Br$_{0.5}$. Solution I containing 120 g of Bi(NO$_3$)$_3$.5H$_2$O in 180 cc of glacial acetic acid was first prepared. Solution II containing 20.6 g of KI, 12.8 g of NaBr, 40.5 g of sodium acetate in 2200 cc of H$_2$O was prepared in a 3-liter beaker at room temperature. In terms of molarities, there were 0.247 mole of Bi, 0.124 mole of NaBr and 0.124 mole of KI in the combined solutions, giving an [0.51$^-$+0.5Br$^-$]/NO$_3^-$ ratio of approximately 1.005. Solution I was run through a dropping funnel in 18 s into Solution II with vigorous stirring. The mixture, with the resultant orange precipitate, was stirred for one hour; the precipitate then was allowed to settle to the bottom of the beaker. After decanting off the top layer, 2 liters of distilled H$_2$O were added and the mixture was stirred vigorously for ten minutes. The washing process was repeated 3 times. The pigment precipitate was filtered onto #4 filter paper, washed with 2000 ml of distilled H$_2$O, and dried for 16 h at 110° C. The yield was 82 g of orange BiOI$_{0.5}$Br$_{0.5}$ pigment. Panels prepared with this pigment showed a particularly bright orange color which by visual comparison had a greater intensity than the BiOI$_{0.5}$Br$_{0.5}$ of Example 4.

A 1:1 mixture of BiOBr/BiOI containing 3.2147 g of BiOI and 2.7853 g of BiOBr was prepared by ball milling. This physical mixture was used to prepare a drawdown and to compare with the PbFCl solid solution BiOI$_{0.5}$Br$_{0.5}$ of Examples 4 and 5. The physical mixture had a dull orange-brown color whereas the solid solution had a bright orange color.

EXAMPLE 6

A solution containing 20 g of Bi(NO$_3$)$_3$.5H$_2$O in 30 cc of glacial acetic acid was added to a room-temperature solution containing 1.711 g of KI, 3.680 g of KBr, 6.764 g of sodium acetate and 400 cc of H$_2$O to form a yellow precipitate. This corresponds to a [0.251$^-$+0.75Br$^-$]/NO$_3^-$ ratio of 1. The mixture was stirred for 2 h, then washed by decantation with H$_2$O several times; the precipitate was filtered off and dried. The yield was 12.6 g of orange-yellow BiOI$_{0.25}$Br$_{0.75}$. The X-ray diffraction pattern showed the PbFCl structure cell dimensions of a=3.936 A (393.6 pm) and c=8.453 A (845.3 pm). Scanning electron micrographs indicated plate-like crystallites with typical thicknesses of 0.02-0.03 μm and widths of 0.1-0.3 μm. There was no color change upon addition of methanol, proving that the powder was not a physical mixture of colorless BiOBr and I$_2$.

EXAMPLE 7

A formulation corresponding to BiOI$_{0.25}$Br$_{0.75}$ was prepared to show the effects of increased temperature and stirring time on pigment particle size. A solution containing 120 g of Bi(NO$_3$)$_3$.5H$_2$O in 180 cc of glacial acetic acid was added to a solution containing 10.270 g of KI, 22.08 g of KBr, 40.58 g of sodium acetate and 2200 cc of H$_2$O at a temperature of 65° C. These amounts provide a [0.251$^-$+0.75 Br$^-$]/NO$_3^-$ ratio of 1. A yellow precipitate formed immediately. The solution and precipitate were stirred for 24 h while the temperature was maintained at 65° C. The precipitate then was washed 4-5 times by decantation with H$_2$O. The resulting BiOI$_{0.25}$Br$_{0.75}$ precipitate weighing 76 g was filtered off and dried at 120° C. The X-ray diffraction pattern shows the PbFCl-structure with cell dimensions a=3.936 A (393.6 pm) and c=8.453 A (845.3 pm).

Scanning electron micrographs made of the product showed irregularly shaped mica-like platelets with a typical thickness of 0.05 μm and widths of 0.5–1.5 μm. Comparison with the product of Example 6 shows that increased temperature and stirring time allows the particle size to be increased. As known to those skilled in the art, further increase in particle sizes with the typical plate-like habit characteristic of bismuth oxyhalides would allow the preparation of nacreous pigments with a pearlescent appearance.

The above procedure was repeated to produce an additional 78 g of $BiOI_{0.25}Br_{0.75}$. This sample was mixed with that prepared above and the mixture was used to prepare 4"×12" (10.2 cm×30.5 cm) paint panels using a commercially available thermoplastic acrylic lacquer (#927) with a pigment to binder ratio of 0.4. These panels were exposed in both Hialeah, Florida and Wilmington, Delaware to a free atmosphere in a black box facing south at a 5° angle with the horizontal. After 6 months' exposure, the panels showed only slight darkening, indicating good resistance to ultra-violet weathering.

EXAMPLE 8

The purpose of this experiment is to evaluate the ultra-violet weathering resistance of orange $BiOI_{0.6}Br_{0.4}$. A solution containing 120 g of $Bi(NO_3)_3.5H_2O$ in 180 cc of glacial acetic acid was added to a solution of 24.630 g of KI, 11.784 g of KBr, 40.590 g of sodium acetate and 2200 cc of $H_2O$ at 65° C. The mixture corresponds to a $[0.25 I^- + 0.75\ Br^-]/NO_3^-$ ratio of 1. The resulting orange precipitate and solution were stirred for 24 h. The precipitate was allowed to settle; it was washed by decantation with $H_2O$ 4–5 times, then filtered off and dried at 120° C. This procedure was repeated. Yields of 80 g and 81 g, respectively, were obtained. The two samples were combined and used to prepare 4"×12" (10.2 cm×30.5 cm) paint samples similar to those above. After 6 months' exposure in Florida and Delaware, a very slight darkening (somewhat less darkening than that in the $BiOI_{0.25}Br_{0.75}$ sample of Example 7) was observed.

EXAMPLE 9

Upon rapidly adding a solution of 20 g of $Bi(NO_3)_3.5H_2O$ in 30 cc of glacial acetic acid to a solution of 5.88 g of KI, 0.233 g of KCl, 0.372 g of KBr, and 6.83 g of sodium acetate in 400 cc of $H_2O$ at 65° C. (corresponding to a $[0.85 I^- + 0.075\ Br^- + 0.075\ Cl^-]/NO_3^-$ ratio of 1.01) while stirring vigorously a reddish-brown precipitate formed. After stirring the slurry for 24 h with the temperature at 65° C. the precipitate was allowed to settle, then washed by decantation 4–5 times with $H_2O$, filtered off and dried at 120° C. An X-ray diffraction pattern showed the $BiOI_{0.85}Br_{0.075}Cl_{0.075}$ precipitate to have the tetragonal PbFCl structure with cell dimensions a=3.979 A (397.9 pm) and c=9.113 A (911.3 pm).

Drawdowns prepared from this pigment were reddish-brown in masstone and salmon in tint. The tint showed the pigment to be of high strength. The colors were of moderate intensity. After a 198 h exposure in the fadeometer, no visible darkening was observed. Thus, pigments containing a large percentage of I, such as $BiOI_{.85}Br_{0.075}Cl_{0.075}$, have excellent fade resistance. Chemical resistance tests using 2% solutions of HCl and $Na_2S$ indicated reaction with these solvents. Little change was observed with 2% NaOH solution.

EXAMPLES 10–12

Examples 10–12 were prepared according to the procedure outlined in Example 9 using the starting materials indicated in Table III. All correspond to a halide to nitrate ion ratio of about 1.01. The colored products all gave single phase X-ray patterns characteristic of the tetragonal structure with cell dimensions given in Table III. Table IV gives the powder diffraction pattern of the $BiOI_{0.65}Br_{0.10}Cl_{0.25}$ of Example 10.

Chemical analyses for Bi, O, I, Br and Cl were made on the products of these examples. The Br analyses could not be made by the normal technique of dissolving in a Ni Parr bomb because of an explosive reaction in the presence of Ni. They were made instead by dissolving the products in $HNO_3$ and titrating with $AgNO_3$. All Br analyses were 2–3% low, presumably because all the Br was not reduced to $Br^-$. Consequently, Br content was determined by difference. The results of the analyses which are given in Table V show that the precipitation process is substantially quantitative and the product composition is substantially the same as that expected from the amounts of reactants used.

The pigment properties of these compositions were evaluated with drawdowns and are summarized in Table VI. Fade resistance is better for those compositions with low Cl content; especially preferred compositions are those with y=0 (in the formula $BiOI_{1-x-y}Br_xCl_y$).

TABLE III

|  | Example 10 | Example 11 | Example 12 |
|---|---|---|---|
| $Bi(NO_3)_3 . 5H_2O$ | 20.00 g | 20.00 g | 20.00 g |
| Glacial Acetic Acid | 30 cc | 30 cc | 30 cc |
| KI | 4.490 g | 3.800 g | 2.770 g |
| KCl | 0.776 g | 0.776 g | 0.930 g |
| KBr | 0.496 g | 0.991 g | 1.487 g |
| Na Acetate | 6.83 g | 6.83 g | 6.83 g |
| Nominal Product | $BiOI_{.65}Br_{.10}Cl_{.25}$ | $BiOI_{.55}Br_{.20}Cl_{.25}$ | $BiOI_{.40}Br_{.30}Cl_{.30}$ |
| Unit Cell Parameters |  |  |  |
| a. | 3.957 A (395.7 pm) | 3.950 A (395.0 pm) | 3.932 A (393.2 pm) |
| c. | 9.02 A (902 pm) | 8.94 A (894 pm) | 8.85 A (885 pm) |
| Masstone Color | Reddish-orange | Orange | Orange |

TABLE IV

X-Ray Diffraction Pattern of BiOI$_{.65}$Cl$_{.25}$

| hkl | d$_{obs}$ | d$_{calc}$ | I$_{obs}$ |
| --- | --- | --- | --- |
| 001 | 9.074 | 9.022 | 40 |
| 101 | 3.622 | 3.624 | 15 |
| 102 | 2.973 | 2.974 | 100 |
| 110 | 2.798 | 2.798 | 85 |
| 111 | 2.672 | 2.672 | 10 |
| 112 | 2.379 | 2.377 | 10 |
| 200 | 1.978 | 1.978 | 60 |
| 201 | 1.932 | 1.932 | 10 |
| 114 | 1.755 | 1.756 | 10 |
| 211 | 1.737 | 1.736 | 5 |
| 212 | 1.647 | 1.647 | 60 |
| 105 | | 1.641 | |
| 213 | 1.525 | 1.525 | 2 |
| 204 | 1.485 | 1.487 | 2 |
| 220 | 1.398 | 1.399 | 10 |
| 302 | | 1.266 | |
| 223 | 1.266 | 1.268 | 14 |
| 215 | | 1.263 | |
| 310 | 1.251 | 1.251 | 25 |

TABLE V

Chemical Analyses of BiOI$_{1-x-y}$Br$_x$Cl$_y$ Pigments

| | Example 10 | Example 11 | Example 12 |
| --- | --- | --- | --- |
| Nominal Composition | BiOI$_{.65}$Br$_{.10}$Cl$_{.25}$ | BiOI$_{.55}$Br$_{.20}$Cl$_{.25}$ | BiOI$_{.40}$Br$_{.30}$Cl$_{.30}$ |
| % I | 25.11 | 23.00 | 16.24 |
| % Br** | 2.76 | 3.77 | 8.30 |
| % Cl | 2.53 | 2.67 | 3.30 |
| % Bi | 64.64 | 65.46 | 67.24 |
| % O | 4.96 | 4.92 | 4.92 |
| Analyzed Composition | BiOI$_{.64}$Br$_{.04}$Cl$_{.23}$ | BiOI$_{.98}$I$_{.58}$Br$_{.18}$Cl$_{.24}$ | BiO$_{.96}$I$_{.40}$Br$_{.31}$Cl$_{.29}$ |

**By Difference

TABLE VI

Pigment Properties of BiOI$_{1-x-y}$Br$_x$Cl$_y$

| Ex. No. | Color Masstone | Tint | Intensity | Strength | Fade Resistance Masstone |
| --- | --- | --- | --- | --- | --- |
| 10 | reddish-orange | orange yellow | med-strong | high | slight darkening after 200 h |
| 11 | orange | orange yellow | med-strong | high | slight darkening after 200 h |
| 12 | orange | yellow | med-strong | high | slight darkening after 200 h |

BEST MODE FOR CARRYING OUT THE INVENTION

The preferred solid solutions are those of the above formula wherein x is about 0.1 to about 0.8 and y is 0. The particular value of x used depends on the desired color.

INDUSTRIAL APPLICABILITY

The bismuth oxyhalide solid solutions of this invention are useful as pigments for imparting color and opacity to products such as paints, plastics, inks, glasses, and paper.

I claim:

1. Bismuth oxyhalide solid solution having the PbFCl structure end of the formula BiOI$_{1-x-y}$Br$_x$Cl$_y$ wherein x is 0 to about 0.8, y is 0 to about 0.3 and x+y is about 0.1 to about 0.8.

2. Bismuth oxyhalide solid solution of claim 1 wherein x is 0 to about 0.3 and x+y is about 0.1 to about 0.3.

3. Bismuth oxyhalide solid solution of claim 1 wherein x is about 0.25 to about 0.8, y is 0 to about 0.05 and x+y is about 0.3 to about 0.8.

4. Bismuth oxyhalide solid solution of claim 1 wherein x is about 0.1 to about 0.8 and y is 0.

5. Bismuth oxyhalide solid solution of claim 4 wherein x is 0.3.

6. Bismuth oxyhalide solid solution of claim 4 wherein x is 0.5.

7. Bismuth oxyhalide solid solution of claim 4 wherein x is 0.6.

8. Bismuth oxyhalide solid solution of claim 4 wherein x is 0.75.

9. Bismuth oxyhalide solid solution of claim 2 wherein x is 0.075 and y is 0.075.

UNITED STATES PATENT OFFICE
CERTIFICATE OF CORRECTION

PATENT NO. : 4,252,570

DATED : February 24, 1981

INVENTOR(S) : Robert D. Shannon

It is certified that error appears in the above-identified patent and that said Letters Patent are hereby corrected as shown below:

Column 12, line 26, Claim 1, "end" should be -- and --.

Signed and Sealed this

Tenth Day of November 1981

[SEAL]

Attest:

Attesting Officer

GERALD J. MOSSINGHOFF

Commissioner of Patents and Trademarks